(12) United States Patent
Gray

(10) Patent No.: US 11,157,679 B2
(45) Date of Patent: Oct. 26, 2021

(54) SEMANTIC NAVIGATION OF CONTENT DOCUMENTS

(71) Applicant: Capital One Services, LLC, McLean, VA (US)

(72) Inventor: Brian Gray, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/773,022

(22) Filed: Jan. 27, 2020

(65) Prior Publication Data

US 2021/0232750 A1    Jul. 29, 2021

(51) Int. Cl.
*G06F 40/106* (2020.01)
*G06F 3/0484* (2013.01)

(52) U.S. Cl.
CPC ........ *G06F 40/106* (2020.01); *G06F 3/04845* (2013.01)

(58) Field of Classification Search
CPC .............................. G06F 16/9558; G06F 9/453
See application file for complete search history.

(56) References Cited

U.S. PATENT DOCUMENTS

| | | | |
|---|---|---|---|
| 5,625,827 A | 4/1997 | Krause et al. | |
| 8,126,984 B2* | 2/2012 | Vogler | G06Q 10/10 709/217 |
| 8,904,434 B2* | 12/2014 | Takao | H04N 5/44513 725/39 |
| 8,957,920 B2* | 2/2015 | Giambalvo | G06T 3/40 345/660 |
| 9,645,707 B1* | 5/2017 | Joyce | G06F 16/958 |
| 10,284,385 B2* | 5/2019 | Combe | H04L 12/2825 |
| 2003/0200347 A1* | 10/2003 | Weitzman | H04L 41/22 719/310 |
| 2008/0109762 A1 | 5/2008 | Hundal et al. | |
| 2013/0191767 A1* | 7/2013 | Peters | G06F 3/0481 715/765 |
| 2014/0109012 A1 | 4/2014 | Choudhary et al. | |
| 2016/0062617 A1* | 3/2016 | Isaacs | G01C 21/32 715/738 |

* cited by examiner

*Primary Examiner* — Alvin H Tan
(74) *Attorney, Agent, or Firm* — Bookoff McAndrews, PLLC

(57) ABSTRACT

A computer-implemented method may be used for semantic navigation of content. The method may include determining a first content complexity level for a user, and presenting a first content to a user device operated by the user. The first content may be presented at the first content complexity level of the user. Additionally, the method may include receiving a navigation command from the user on a portion of the first content via the user device; and determining a second content at a second content complexity level based on the navigation command. The second content may convey the same information as the first content. Additionally, the method may include replacing the first content with the second content on the user device. The second content may be presented at the second content complexity level, and the second content complexity level may be different than the first content complexity level.

20 Claims, 5 Drawing Sheets

SEMANTIC NAVIGATION OF CONTENT DOCUMENTS

TECHNICAL FIELD

Various embodiments of the present disclosure relate generally to navigating content, and more particularly to semantic navigation of content having varied context complexity levels.

BACKGROUND

Appropriate level of content, both in terms of detail granularity and language grade level, can be considered an accessibility issue as they pertain to communicating a message clearly to a user. In recent years, with the proliferation of consumer electronic devices, content materials are increasingly being produced for electronic consumption. Unfortunately, catalogs, indexes, and tables of contents that are typically used with large documents do not scale well for such electronic access. As a result, users using such documents are often presented with lengthy lists of materials for their review while attempting to locate desired documents or portions thereof. Such review can be both daunting and time-consuming. As an alternative to the use of traditional catalogs, indexes, and tables of contents, electronic queries and searches may be performed to find desired reference documents. However, such queries and searches typically do not enable users to discover interrelationships between documents that might be found during the use of traditional catalogs, indexes, and table of contents. Furthermore, potentially relevant documents may not be located by electronic queries and searches. Additionally, consumer electronic devices, such as cell phones and tablets, may only be equipped with relatively small displays, which may limit an amount of detail of a document which may be presented at any given time.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, non-transitory computer readable media, systems, and methods are disclosed for navigation of content. Each of the examples disclosed herein may include one or more of the features described in connection with any of the other disclosed examples.

In one example, a computer-implemented method for semantic navigation of content may include determining, by one or more processors, a first content complexity level for a user; presenting, by the one or more processors, a first content to a user device operated by the user, wherein the first content is presented at the first content complexity level of the user; receiving, by the one or more processors, a navigation command from the user on a portion of the first content via the user device; determining, by the one or more processors, a second content at a second content complexity level based on the navigation command, wherein the second content conveys the same information as the first content; and replacing, by the one or more processors, the first content with the second content on the user device, wherein the second content is presented at the second content complexity level, wherein the second content complexity level is different than the first content complexity level.

According to another aspect of the disclosure, a computer system for semantic navigation of content may include a memory having processor-readable instructions stored therein and a processor configured to access the memory and execute the processor-readable instructions to perform a plurality of functions. The functions may include determining a first content complexity level for a user; presenting a first content to a user device operated by the user, wherein the first content is presented at the first content complexity level of the user; receiving a navigation command from the user on a portion of the first content via the user device; determining a second content at a second content complexity level based on the navigation command, wherein the second content conveys the same information as the first content; and replacing the first content with the second content on the user device, wherein the second content is presented at a second content complexity level, wherein the second content complexity level is different than the first content complexity level.

In another aspect of the disclosure, a computer-implemented method of semantic navigation of content may include determining, by one or more processors, a first content complexity level for a user; presenting, by the one or more processors, a first content to a user device operated by the user, wherein the first content is presented at the first content complexity level of the user; receiving, by the one or more processors, a navigation command from the user on a portion of the first content via the user device; determining, by the one or more processors, a second content at a second content complexity level based on the navigation command, wherein the second content conveys the same information as the first content; replacing, by the one or more processors, the first content with the second content on the user device, wherein the second content is presented at a second content complexity level, wherein the second content complexity level is different than the first content complexity level; and displaying, by the one or more processors, the second content at a center of a display of the user device.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
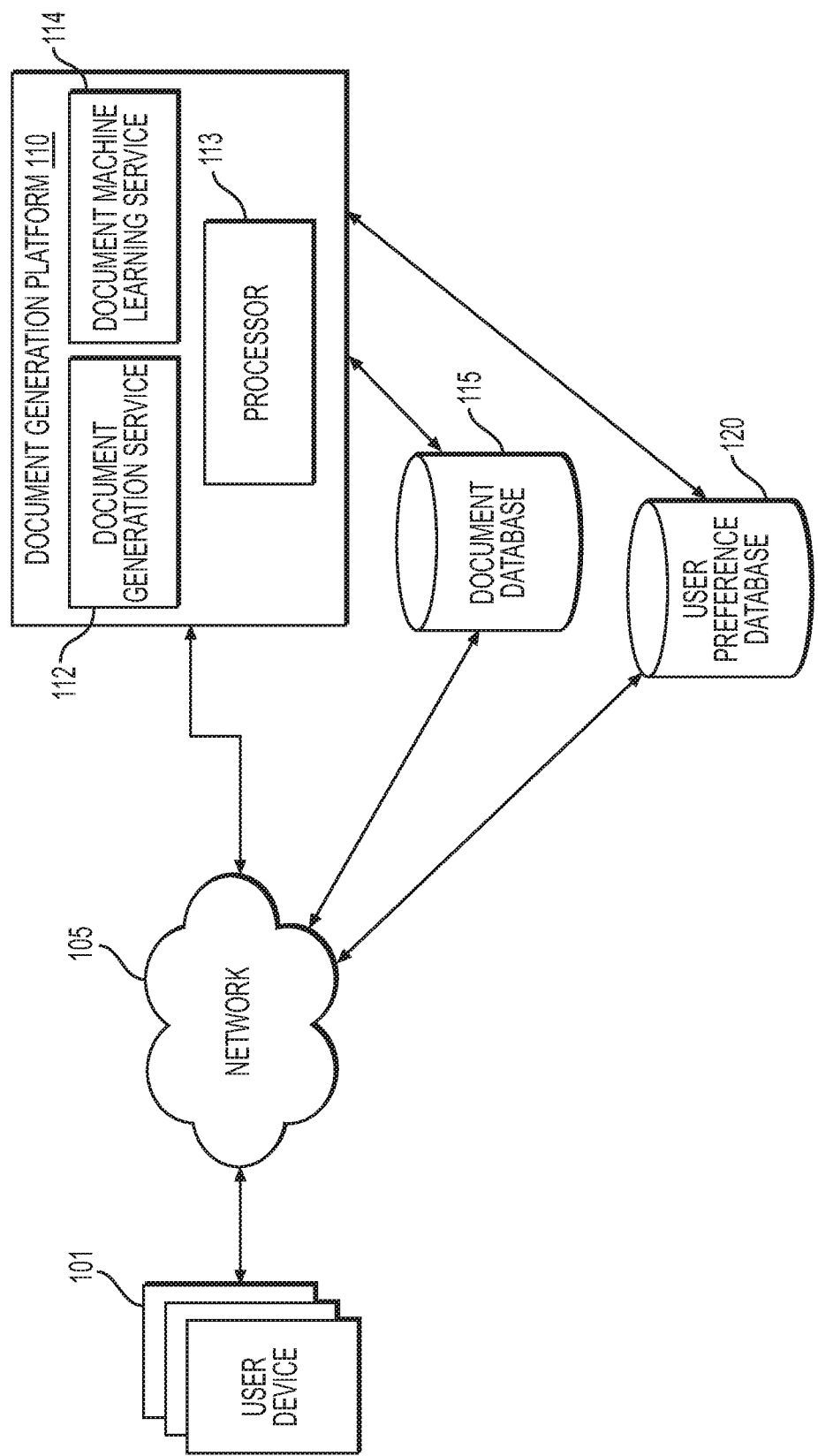
FIG. 1 depicts an exemplary environment in which systems, methods, and other aspects of the present disclosure may be implemented.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompany drawings. Various embodiments of the present disclosure relate generally to methods and systems for determining the appropriate complexity reading level for an user. For example, various embodiments of the present disclosure relate to determining the user preferred content consumption complexity level. In some arrangements, content may be presented to the user at the preferred content consumption complexity level and the user may be able to navigate the content to increase or decrease the consumption complexity level, as deemed needed or desired.

As described above, in order to provide appropriate accessibility to a user reviewing content, the content needs to be presented at an appropriate level of complexity. If the content is provided to a user with too much detail, the user may become overwhelmed and confused about how to navigate away from or through the document. If the content is provided to a user with too little detail, the user may be required to expend additional time in order to collect sufficient detail. Therefore, a need exists to provide different users with the relevant level of detail according to the content complexity level of the individual users. Further, various users may use different navigation commands according to the type of device a respective user may be using to navigate between complexity levels.

Referring now to the appended drawings, FIG. 1 depicts an exemplary environment 100 in which systems, methods, and other aspects of the present disclosure may be implemented.

In accordance with FIG. 1, environment 100 may include one or more user device(s) 101 each associated with one or more users, a network 105, a document generation platform 110, a document database 115, and user preference database 120. One or more of these components may be connected to one another via the network 105. Such a network may be any suitable network or combination of networks and may support any appropriate protocol suitable for communication of data between various components in the system environment 100. The network may include a public network (e.g., the Internet), a private network (e.g., a network within an organization, or intranet), or a combination of public and/or private networks.

Each user device 101 may be a computing device, as described in further detail with reference to FIG. 5. User devices 101 may include one or more smartphones, wearable computing devices, tablet computers, laptops, electronic readers, or personal digital assistants. Each user device 101 may have a screen for displaying content and navigation instructions, and may be connected to at least one input device (e.g., mouse or keyboard). Each user device 101 may be configured to receive various types of inputs (e.g., navigation commands) from a user thereof, such as zoom-in gestures and zoom-out gestures. For example, user device 101 may receive navigation commands via touch, voice, gesture, mouse, keyboard, pen, stylus, or other types of input operation known in the art or to become known in the art.

As shown in FIG. 1, document generation platform 110 may include a processor 113, a document generation service 112, and a document machine learning service 114. Document generation service 112, in conjunction with processor 113, may permit users to create documents as consumable content for the one or more user devices 101. Document generation service 112 may be configured to generate text content (e.g., Microsoft Word, Excel, PowerPoint, Adobe PDF, etc.), webpage content (e.g., HTML, etc.), and/or image content (e.g., Adobe Photoshop, JPG, etc.).

Document machine learning service 114 may determine a user's preferred content complexity level using any appropriate machine learning algorithm known in the art, and may be trained based on various criteria. For example, document machine learning service 114 may monitor consumable contents generated by a user via document generation service 112. If the user creates content at a specific complexity level, then document machine learning service 114 may determine the specific complexity level is the preferred complexity level of the user. In another embodiment, document generation service 112 may monitor a content consumption of a user and determine the preferred complexity level of the user based on the manner in which the user interacts with the content. For example, document generation service 112 may establish a preferred complexity level of the user if the user navigates to a specific complexity level whenever the user consumes content. In another embodiment, the document generation service 112 may use data related to the user in determining the preferred complexity level of the user. Examples of data related to the user may include the job title of the user, the hierarchal position of the user within an organization (e.g., a corporation), the sophistication or education level of the user, work experience of the user, and/or a user supplied preferred content complexity level. As such, if the user has the term "manager" in his/her job title, document generation service 112 may use the job title to determine that a low complexity level may be the preferred complexity level of the user because the user may prefer to view summaries of contents due to time constraints, and may only navigate to portions of the content with more detail when necessary.

Document database 115 may be any suitable database and may store content created by the one or more users using document generation platform 110, and any content available for consumption by the one or more users using the one or more user device 101. User preference database 120 may be any suitable database and may store user preference data related to the preferred content complexity level of the user. For example, user preference data may include the job title of the user, the hierarchal position of the user within an organization (e.g., corporation), the sophistication or education level of the user, work experience of the user, or a user supplied preferred content complexity level.

Document generation platform 110 may include one or more computer systems configured to gather, process, transmit, and/or receive data. In general, whenever document generation platform 110 is described as performing an operation of gathering, processing, transmitting, or receiving data, it is understood that such operation may be performed by a computer system thereof. In general, a computer system may include one or more computing devices, as described in connection with FIG. 5 below.

Figure 2:
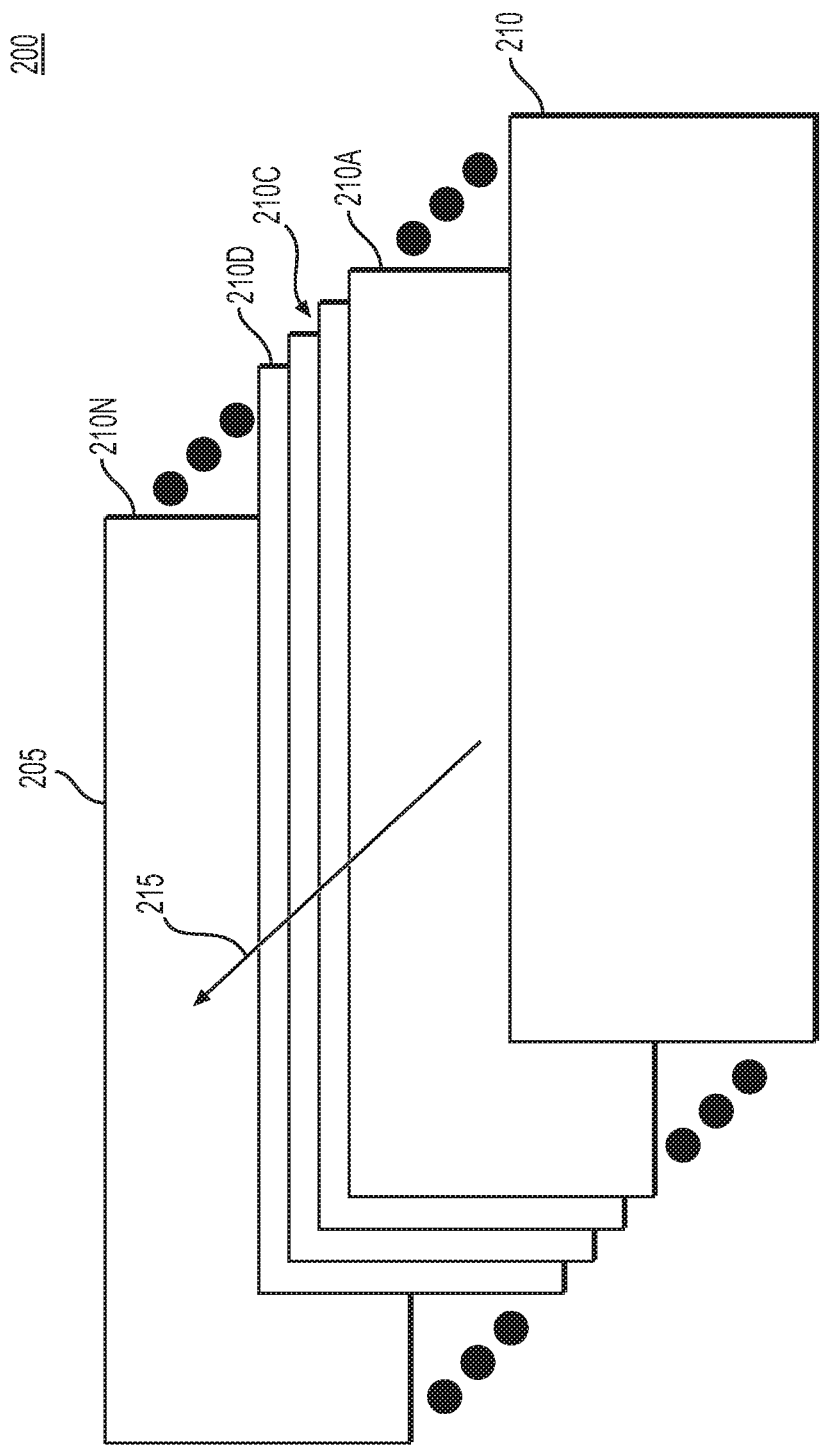
FIG. 2 depicts an exemplary block diagram of a document tagging process, according to one aspect of the present disclosure.

FIG. 2. depicts an exemplary block diagram 200 of a content tagging process, according aspects of the present disclosure. As shown in FIG. 2, content 205 (e.g., a document or other such consumable information conveyor) may be presented in a variety of differing complexity levels. For example, content 205 may have an increasing level 215 of complexity. For example, content 205 may have "N" complexity levels based on one or more factors (e.g., a length, a detail, and/or an intended audience) of content 205, and sorted from least complex to most complex. That is, content 205 may include a first or baseline level of complexity content page 210. For example, content page 210 may represent a table of contents, listing all the contents of content pages 210A-210N. Notably, the information presented on each of content pages 210A-210N is the same, however each content page 210A-210N may represent a different complexity level (e.g., the amount of detail). For example, while content page 210 may represent the lowest content complexity level (e.g., the least amount of detail) by containing an overview of the entire content, content page 210N may represent the highest content complexity level (e.g., the most amount of detail) by containing the most detailed presentation of the same information.

Each content page 210-210N may contain metadata that corresponds to the location of each content page 210A-210N within content 205 such that when a user performs a navigation command on a portion of content 205, the correct portion of the content page is selected from content pages 210A-210N and presented to the user. In another embodiment, the content page 210 may list one or more uniform resource locators (URLs), and content pages 210A-210N may be HTML pages corresponding to the one or more individual URLs. As such, when the user performs a navigation command on a URL the appropriate HTML page may be selected and presented to the user.

The preferred content complexity level of a user determined by document machine learning service 114 may dictate which content page within 210-210N is presented to the user when the user first begins to consume the content. For example, a user at a manger level may be presented with content page 210 (e.g., the table of contents) and a user at a document production level may be presented with content page 210D, which displays the same information as the table of contents but with more details. The users may then select different content complexity levels by performing navigation commands on the respective content page. For example, the user at the manger level may issue a zoom-in command via the one or more user devices 101 on a relevant portion of the table of contents (e.g., content page 210), and the content page within pages 210-210N corresponding to the relevant portion of the table of contents may be presented to the user via the display of the one or more user devices 101. If a user at the document production level decides to view the information in a less detail level, the user may perform a zoom-out command via the one or more user devices 101 on a relevant portion of content page 210D, and the content page within pages 210-210C corresponding to the relevant portion of content page 210D may be presented to the user via a display of the one or more user devices 101.

Figure 3:
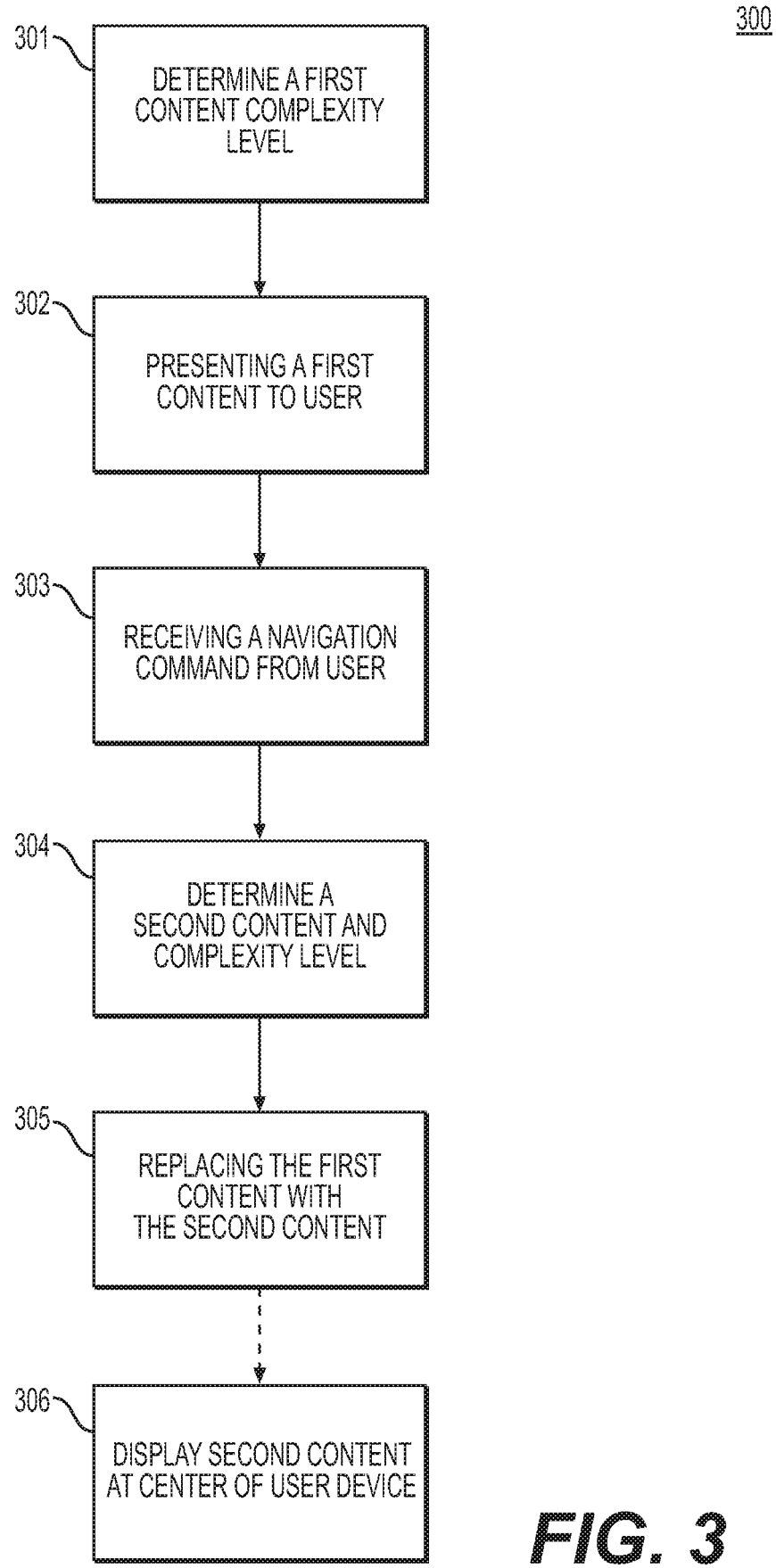
FIG. 3 depicts an exemplary flow diagram of a method for semantic navigation, according to aspects of the present disclosure.

FIG. 3 depicts an exemplary flow diagram of a method 300 for semantic navigation, according aspects of the present disclosure. Method 300 may begin at step 301, in which a determination is made of a first content complexity level of the user. The first content complexity level of the user may be the preferred content complexity level of the user, and may be determined by document machine learning service 114, as discussed above with reference to FIG. 1. For example, the first content complexity level of the user may be determined by the content created by the user, by monitoring the interactions by user with the content, and/or based on the job title of the user, the hierarchal position of the user within an organization (e.g., corporation), the sophistication or education level of the user, the work experience of the user, or a user supplied preferred content complexity level.

At step 302, a content (e.g., a document or other consumable information conveyor) may be presented to a user via one a user device 101 associated with the user. The content may be presented at the first content complexity level of the user. The content may be a content stored in the document database 115 or it may be a content retrieved via network 105. The content may be a content created by the user, or it may be content created by another user. Additionally, one or more navigation command instructions may be presented to the user via the user device 101. Navigation command instructions may be instructions that indicate to the user how to change from one content complexity level to another content complexity level. Such navigation command instructions may vary based on a type of user device 101. For example, if the user device 101 can be operated via touch commands, then the instruction may be for the user to issue a pinch command. For example, a "pinch in" command may result in an increase in the content complexity level (e.g., zoom-in) and a "pinch out" command may result in a decrease in the content complexity level (e.g., zoom-out). If the user device 101 can be operated via a keyboard, then the instruction may illustrate keyboard shortcuts. For example, a "+" key may be used for a zoom-in command while a "−" key may be used for a zoom-out command. If the user device 101 can be operated via voice, then the instruction may direct the user to issue voice commands. For example, the user may speak "zoom-in" for a zoom-in command and "zoom-out" for a zoom-out command. If the user device 101 may be operated via a mouse, pen, or stylus, then the instruction may illustrate via icons on the display of the user device 101 either next to the content or as an overlay on top of the content. For example, the user device 101 may display a "+" icon or a "−" icon and the user may use the mouse, pen or stylus to click on the "+" for a zoom-in command, and/or click on the "−" icon for a zoom-out command.

At step 303 a navigation command may be received from the user on a portion of the content via the user device 101. For example, if a user wants to read a more detailed version of a section of the content, the user may pinch in on the section of the content. Conversely, if a user wants to read a less detailed version of a section of the content, the user may pinch out on the section of the content. In another embodiment, the user may use a mouse or a keyboard and position the portion of the content of interest in the middle (e.g., a central portion) of the display of the user device 101 and may use the "+" or "−" icon on the display to navigate to a more or less detailed version of the content.

Upon receiving the navigation command at step 303, the appropriate content page within pages 210A-210N may be determined. The appropriate content page may be determined based on the current content page presented to the user and the navigation command issued by the user. For example, if page 210A is currently presented to the user and the user issues a zoom-in command on a portion of page 210A, the processor 113 may search through content pages 210A-210N and determine that page 210N may correspond to the portion of page 210A, where 210N represents the same information as page 210A, but with an increase in detail. Conversely, if page 210N is currently presented to the user and the user issues a zoom-out command on a portion of the page 210N, the processor 113 may search through content pages 210A-210N and determine that page 210D may correspond to the portion of page 210N, where page 210D represents the same information as page 210N, but with a decrease in detail.

Upon determining the appropriate content page within pages 210A-210N of step 304, then at step 305 the appropriate content page may be transmitted to the user device 101 via the network 105, and may be displayed via the display of the user device 101. In the above example, where the user issues a zoom-in command from content page 210A, and content page 210N is determined as the appropriate content page, content page 210N may be transmitted to the user device 101 and may replace content page 210A on the display of the user device 101.

Optionally, at step 306, content page 210N may be displayed as an overlay in the center of the display of the user device 101, or content page 210N may be displayed as a pop-up in the center of the display of the user device 101 over content page 210A. In another embodiment, the overlay and/or pop-up display of page 210N may be focused on the currently viewed context as determined by the metadata. In such a manner, a user may be provided with a full-detail explanation of only what is being currently viewed.

Figure 4A:
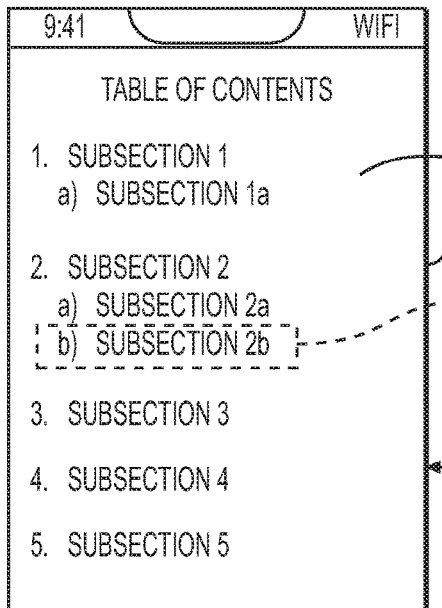
FIGS. 4A-4C depict an exemplary user interface of the present disclosure, according to aspects of the present disclosure.
Figure 4B:
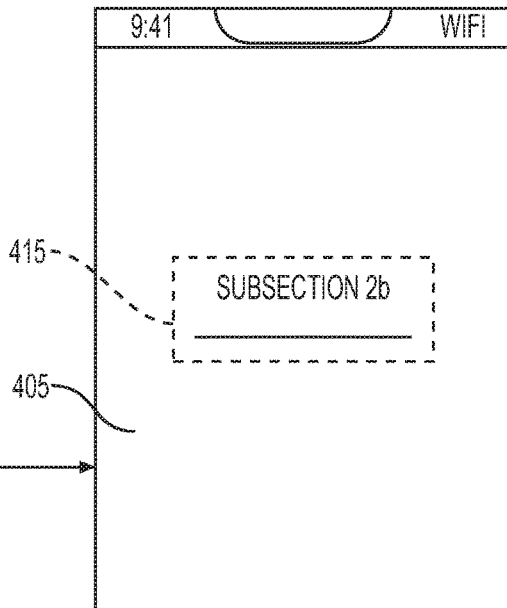
Figure 4C:
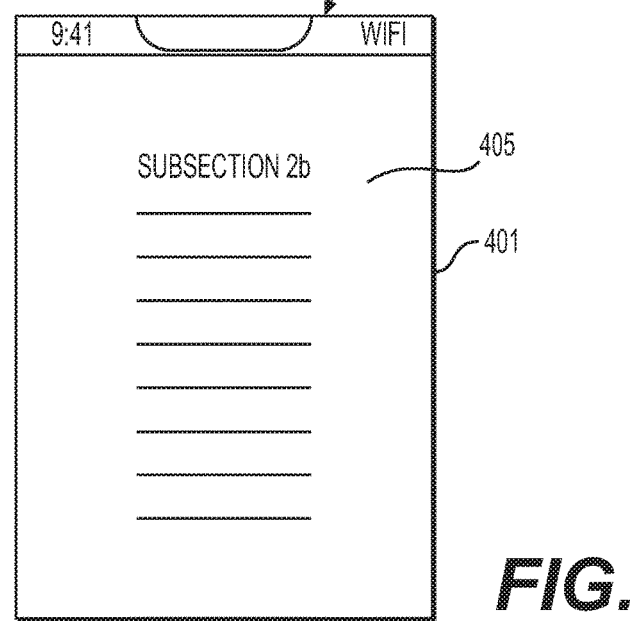

FIGS. 4A-4C depict an exemplary user interface 400, according to one aspect of the present disclosure. Exemplary user interface 400 may be presented on a display 405 of a user device 401 (corresponding to one of the user devices 101 depicted in FIG. 1). Display 405 may be configured to present content to a user associated with user device 401. As shown in FIG. 4A, a table of contents may be displayed to the user via display 405. The table of contents may be the preferred content complexity level of the user, or it may be a different content complexity level to which the user navigated according to one or more navigation commands. After viewing the table of contents, a user may decide to see a summary of subsection 2b as depicted in FIG. 4B. As such the user may the issue a navigation command to zoom in on the portion 410 of the content displaying "SUBSECTION 2b". As such, the user may then issue a navigation command to zoom in on the portion 410 of the content displaying "SUBSECTION 2b". The zoom-in navigation command type may depend on the type of device of user device 401, as disclosed above with respect to step 302 of FIG. 3. Once the zoom-in command is issued by the user, the processor 113 may look through the entire content to find the content page that corresponds to "SUBSECTION 2b" at the complexity level requested by the user. Once the content page is determined, it may be transmitted to the user device 401 and displayed via display 405. Notably, the content page that corresponds to "SUBSECTION 2b" is at a different content complexity level (e.g., zoomed in) compared to the table of contents page previously displayed. Additionally, the content page that corresponds to "SUBSECTION 2b" may be displayed in the center of the display 405, as an overlay or a pop-up with accompanying display animation.

After viewing the summary of subsection 2b, the user may decide to view a detailed view of subsection 2b as depicted in FIG. 4C. As such, the user may then issue a navigation command to zoom in on the portion 415 of the content displaying "SUBSECTION 2b". The zoom-in navigation command type may depend on the type of device of user device 401, as disclosed above with respect to step 302 of FIG. 3. Once the zoom-in command is issued by the user, the processor 113 may look through the entire content to find the content page that corresponds to "SUBSECTION 2b" at the complexity level requested by the user. Once the content page is determined, it may be transmitted to the user device 401 and displayed via display 405. Notably, the content page that corresponds to "SUBSECTION 2b" is at a different content complexity level (e.g., zoomed in) compared to the table of contents page previously displayed. Additionally, the content page that corresponds to "SUBSECTION 2b" may be displayed in the center of the display 405, as an overlay or a pop-up with accompanying display animation.

In another embodiment, "SUBSECTION 2b" depicted in FIGS. 4B and 4C may be the preferred content complexity level, and the user may decide to issue a navigation command to zoom out on "SUBSECTION 2b" and view a less detailed view of the content. The navigation command issued for zoom-out may depend on the type of device, as discussed above with respect to step 302 of FIG. 3. Once the zoom-out command is issued by the user, the processor 113 may look through the entire content to find the content page that corresponds to "SUBSECTION 2b" at the complexity level requested by the user. Once the content page is determined, it may be transmitted to the user device 401 and displayed via display 405. In this exemplary embodiment, the content page corresponding to "TABLE OF CONTENTS" is displayed on display 405. Notably, the "TABLE OF CONTENTS" page is at a different content complexity level (e.g., zoomed out) compared to the "SUBSECTION 2b" page previously displayed.

Figure 5:
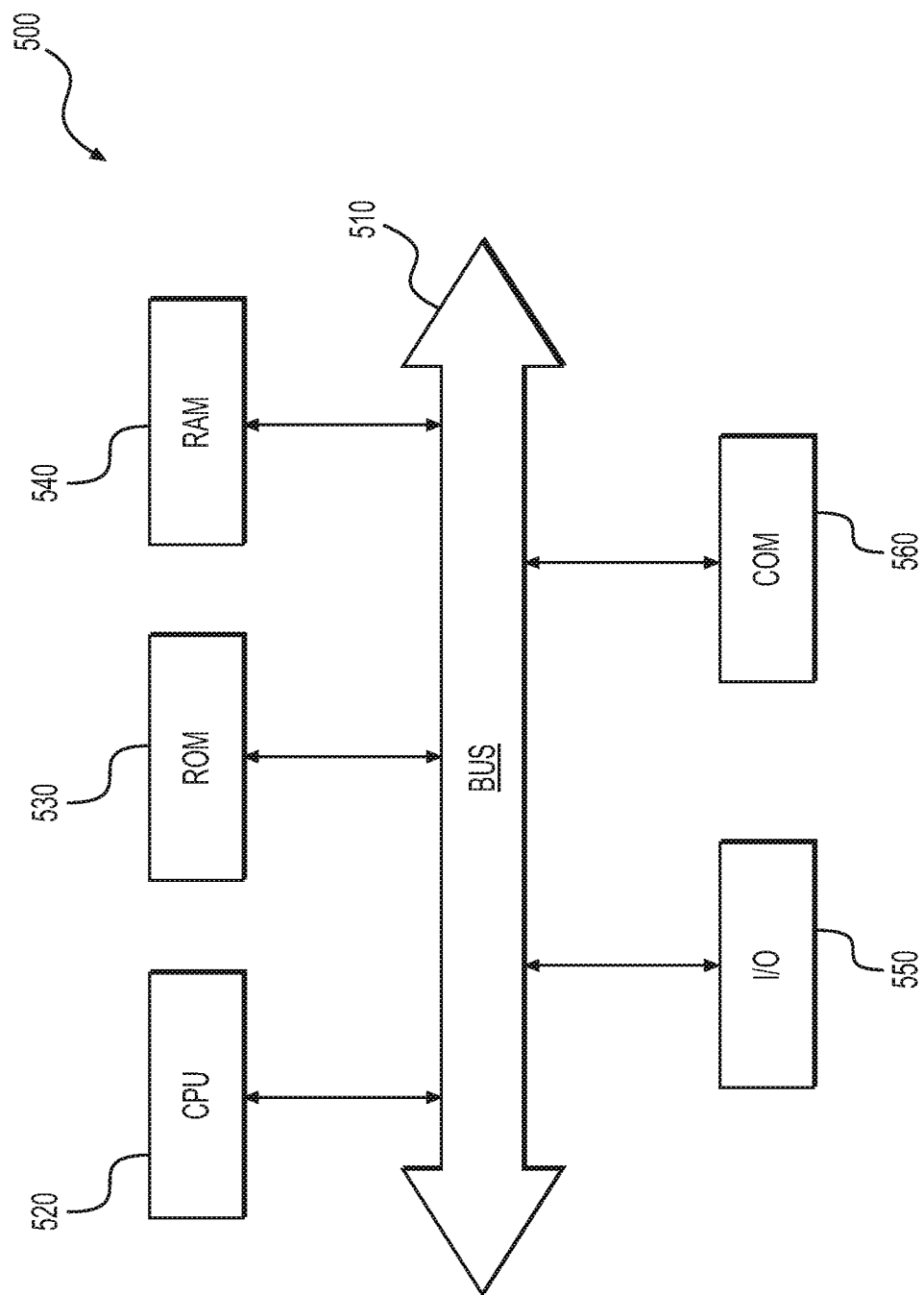
FIG. 5 depicts an example of a computing device, according to aspects of the present disclosure.

FIG. 5 depicts a high-level functional block diagram of an exemplary computer device or system, in which embodiments of the present disclosure, or portions thereof, may be implemented, e.g., as computer-readable code. In some implementations, the user device 101 and the document generation platform 110 (depicted in FIG. 1) may correspond to device 500. Additionally, or alternatively, the user device 401 may correspond to device 500. Additionally, each of the exemplary computer servers, databases, user interfaces, modules, and methods described above with respect to FIGS. 1-4 can be implemented in device 500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-4.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-4, may be implemented using device 500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 5, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multi-processor system, such system operating alone, or in a cluster of computing devices operating in a cluster or server farm. CPU 520 may be connected to a data communication infrastructure 510, for example, a bus, message queue, network, or multi-core message-passing scheme.

Device 500 also may include a main memory 540, for example, random access memory (RAM), and also may include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method of semantic navigation of content utilizing machine learning, the method comprising:
   receiving, by a processor, first data that includes first information associated with previous interactions between a user and at least one content item, the first information including at least one of the user's job title or one or more contents created by the user;
   predicting, via a trained machine learning model executed by the processor and based on the first data, a first content complexity level for the user, wherein:
      the trained machine learning model is trained, based on (i) second data that includes second information associated with previous interactions between one or more persons and one or more content items as test data, and (ii) third data that includes complexity levels for the one or more persons; and
      the second information includes at least one of job titles of the one or more persons or one or more contents created by the one or more persons;
   presenting, by the one or more processors, a first content to a user device operated by the user, wherein the first content is presented at the first content complexity level of the user;
   receiving, by the one or more processors, a navigation command from the user on a portion of the first content via the user device;
   determining, by the one or more processors, a second content at a second content complexity level based on the navigation command, wherein the second content conveys the same information as the first content; and
   replacing, by the one or more processors, the first content with the second content on the user device, wherein the second content is presented at the second content complexity level, wherein the second content complexity level is different than the first content complexity level.

2. The computer-implemented method of claim 1, further including:
   adjusting, by the one or more processors, the first content complexity level of the user upon a detected change in at least one of the user's job title or the one or more contents created by the user.

3. The computer-implemented method of claim 1, wherein the first content and the second content each include at least one of an Uniform Resource Locator (URL), a text document, or an image.

4. The computer-implemented method of claim 1, further including:
   tagging the portion of the first content, wherein the second content is related to the portion of the first content via the tagging.

5. The computer-implemented method of claim 1, wherein the first content is disparate from the second content such that the second content includes at least one of an Uniform Resource Locator (URL), a text document, or an image disparate from the first content.

6. The computer-implemented method of claim 1, wherein the navigation command is at least one of a zoom-in, a zoom-out, or a pinch gesture.

7. The computer-implemented method of claim 1, wherein the replacing the first content with the second content on the user device further includes presenting the second content as a pop-up on top of the first content.

8. The computer-implemented method of claim 1, wherein the user device is a type of user device selected from at least one of a laptop, a desktop, a mobile phone, a tablet, an e-reader, or a wearable.

9. The computer-implemented method of claim 8 further including:
   displaying, by the one or more processors, instructions pertaining to the navigation command based on the type of the user device.

10. The computer-implemented method of claim 1, wherein the determining a first content complexity level for a user is further based on a user preference or previous user navigation commands.

11. The computer-implemented method of claim 1, wherein the at least first content item is a document, wherein the first content presented at the first content complexity level of the user is further presented as a table of contents for the at least first content; and wherein the second content presented at the second content complexity level is further presented as a page of the document.

12. A computer system for semantic navigation of content utilizing machine learning, the computer system comprising:
   a memory having processor-readable instructions stored therein; and
   at least one processor configured to access the memory and execute the processor-readable instructions, which when executed by the processor configures the processor to perform a plurality of functions, including functions for:
      receiving first data that includes first information associated with previous interactions between a user and at least one content item, the first information including at least one of the user's job title or one or more contents created by the user;

predicting, via a trained machine learning model based on the first data, a first content complexity level for a user, wherein the trained machine learning model is trained, based on (i) second data that includes second information associated with previous interactions between one or more persons and one or more content items as test data, and (ii) third data that includes complexity levels for the one or more persons; and the second information at least one of job titles of the one or more persons or one or more contents created by the one or more persons;

presenting a first content to a user device operated by the user, wherein the first content is presented at the first content complexity level of the user;

receiving a navigation command from the user on a portion of the first content via the user device;

determining a second content at a second content complexity level based on the navigation command, wherein the second content conveys the same information as the first content; and replacing the first content with the second content on the user device, wherein the second content is presented at a second content complexity level, wherein the second content complexity level is different than the first content complexity level.

13. The computer system of claim 12, wherein the first content and the second content each include at least one of an Uniform Resource Locator (URL), a text document, or an image.

14. The computer system of claim 12, wherein the plurality of functions further includes tagging the portion of the first content, wherein the second content is related to the portion of the first content via the tagging.

15. The computer system of claim 12, wherein the first content is disparate from the second content such that the second content includes at least one of an Uniform Resource Locator (URL), a text document, or an image disparate from the first content.

16. The computer system of claim 12, wherein the navigation command is at least one of a zoom-in, a zoom-out, or a pinch gesture.

17. The computer system of claim 12, wherein the replacing the first content with the second content on the user device further includes presenting the second content as a pop-up on top of the first content.

18. The computer system of claim 12, wherein the user device is a type of user device selected from at least one of a laptop, a desktop, a mobile phone, a tablet, an e-reader, or a wearable.

19. The computer system of claim 18, wherein the plurality of functions further include:

displaying instructions pertaining to the navigation command based on the type of the user device.

20. A computer-implemented method of semantic navigation of content utilizing machine learning, the method comprising:

receiving, by a processor, first data that includes first information associated with previous interactions between a user and at least one content item, the first information including at least one of the user's job title or one or more contents created by the user;

predicting, via a trained machine learning model executed by the processor and based on the first data, a first content complexity level for the user, wherein the trained machine learning model is trained, based on (i) second data that includes information associated with previous interactions between one or more persons and one or more content items as test data, and (ii) third data that includes complexity levels of one or more persons; and the second information includes at least one of job titles of the one or more persons or one or more contents created by the one or more persons;

presenting, by the one or more processors, a first content to a user device operated by the user, wherein the first content is presented at the first content complexity level of the user;

receiving, by the one or more processors, a navigation command from the user on a portion of the first content via the user device;

determining, by the one or more processors, a second content at a second content complexity level based on the navigation command, wherein the second content conveys the same information as the first content;

replacing, by the one or more processors, the first content with the second content on the user device, wherein the second content is presented at a second content complexity level, wherein the second content complexity level is different than the first content complexity level; and displaying, by the one or more processors, the second content at a center of a display of the user device.

* * * * *